United States Patent
Henderson (12)

(10) Patent No.: US 6,254,774 B1
(45) Date of Patent: Jul. 3, 2001

(54) APPARATUS FOR RADIOACTIVE PARTICULATE FILTRATION

(76) Inventor: James R. Henderson, P.O. Box 34, Emlenton, PA (US) 16373

( * ) Notice: Subject to any disclaimer, the term of this patent is extended or adjusted under 35 U.S.C. 154(b) by 0 days.

(21) Appl. No.: 09/425,919

(22) Filed: Oct. 25, 1999

(51) Int. Cl.[7] .............................. B01D 29/33; B01D 29/96
(52) U.S. Cl. ....................... 210/323.2; 210/332; 210/238; 210/456; 376/313
(58) Field of Search .............................. 210/323.1, 323.2, 210/324, 345, 385, 398, 232, 236, 237, 238, 322, 456, 332; 55/422; 376/313

(56) References Cited

U.S. PATENT DOCUMENTS

| | | |
|---|---|---|
| 1,547,368 | 7/1925 | Dehne . |
| 3,064,818 * | 11/1962 | Kasten ................................. 210/238 |
| 3,615,016 * | 10/1971 | Soriente et al. ..................... 210/232 |
| 3,838,289 | 9/1974 | White . |
| 3,890,233 | 6/1975 | Gishel . |
| 4,032,449 | 6/1977 | DeVisser et al. . |
| 4,224,160 | 9/1980 | Wendlund . |
| 4,257,880 | 3/1981 | Kudryavtsev et al. . |
| 4,280,906 * | 7/1981 | Lijergren ............................... 210/282 |
| 4,283,282 | 8/1981 | Saint-Dizier et al. . |
| 4,572,710 | 2/1986 | Stock et al. . |
| 4,828,691 | 5/1989 | Abbott et al. . |
| 4,883,588 | 11/1989 | Primavera et al. . |
| 5,017,330 | 5/1991 | Hurdiel . |
| 5,347,554 | 9/1994 | White et al. . |
| 5,379,330 | 1/1995 | Lovell et al. . |
| 5,478,469 | 12/1995 | Bryan et al. . |

FOREIGN PATENT DOCUMENTS

4118432 * 12/1992 (DE) .............................. B01D/29/96

* cited by examiner

*Primary Examiner*—Matthew O. Savage
(74) *Attorney, Agent, or Firm*—George C. Atwell

(57) ABSTRACT

Apparatus is provided for filtering particulate matter from a fluid flow pumped from a coolant pool for a nuclear reactor. The apparatus comprises a large vessel with an interior chamber in which is rotatably supported a turntable in the form of a rigid basket-like support structure on which a large number of disposable filter cartridges are removably secured. Part of the turntable is a manifold assembly for distributing contaminated fluid received from a central conduit to the inlet side of the filter cartridges in the chamber. The vessel serves as a containment for coolant processed through the filters whereby the cleansed coolant may be conducted outwardly from the vessel through an outlet port and piped back to the pool of origin. Gate means are provided on the vessel in the form of normally closed ball valves which allow, during shut-down of the apparatus, extension, into and through the vessel, of tools to manipulate the turntable within the vessel and to accomplish filter cartridge replacement.

13 Claims, 11 Drawing Sheets

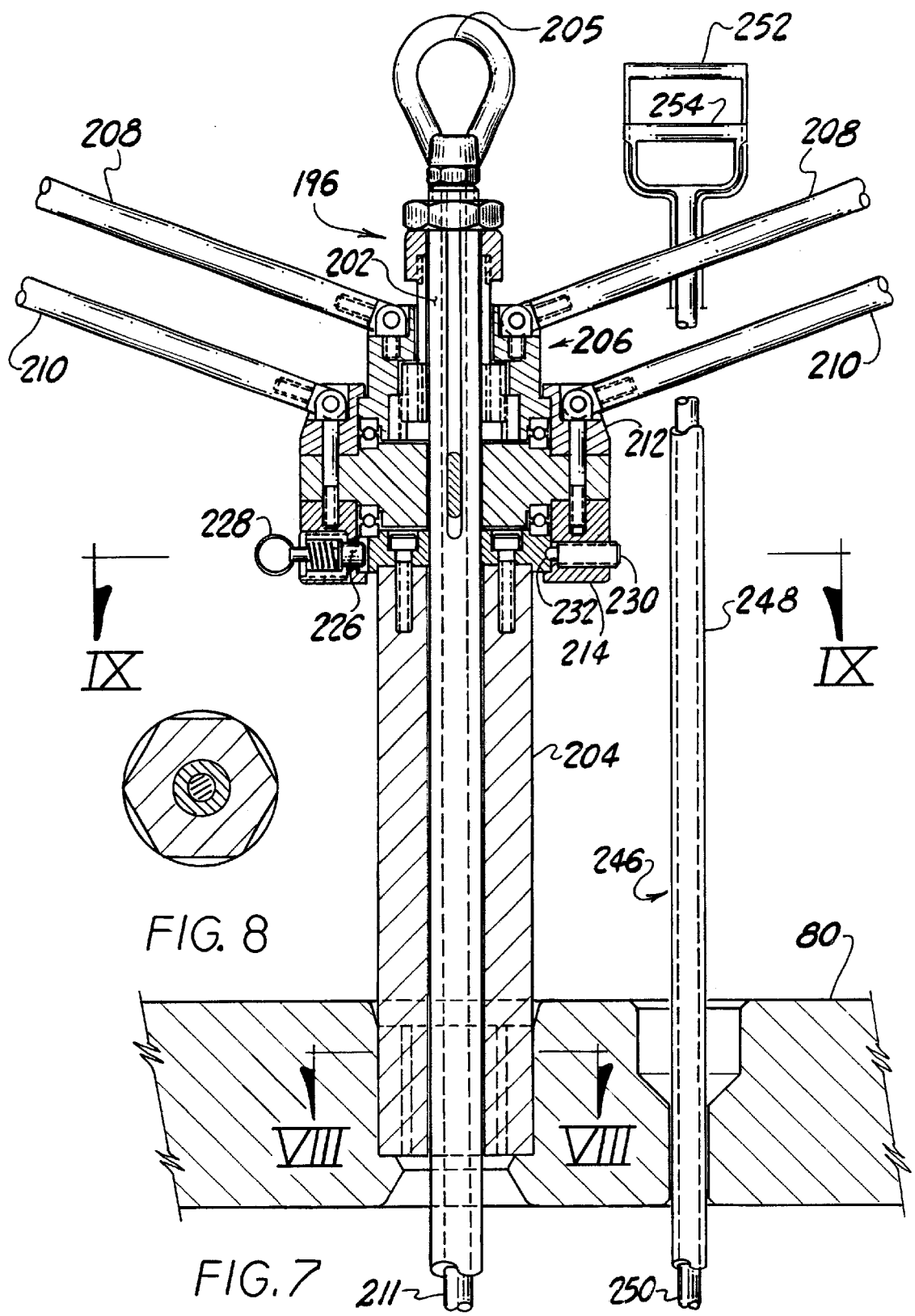

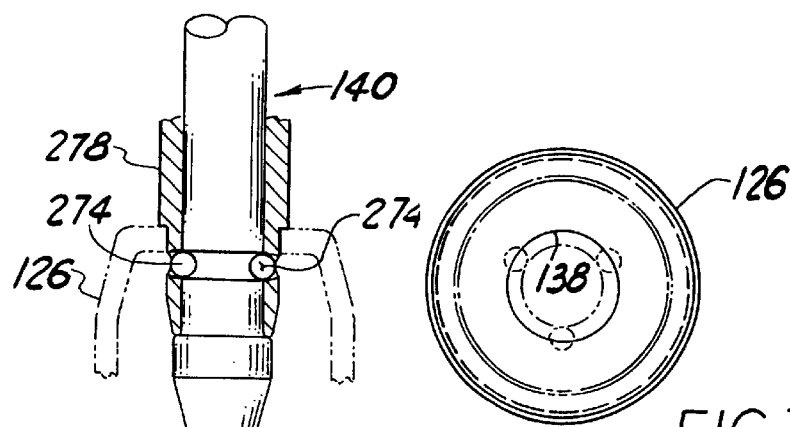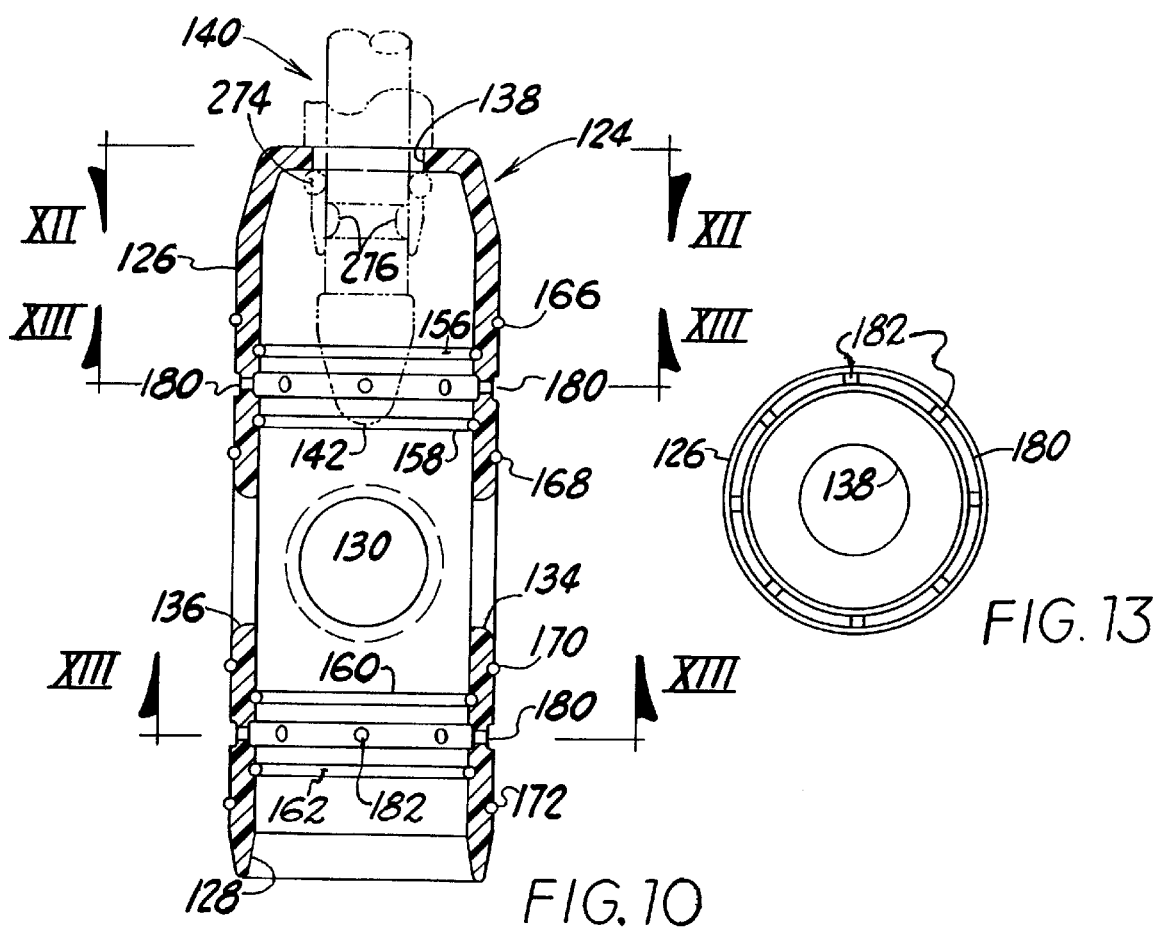

APPARATUS FOR RADIOACTIVE PARTICULATE FILTRATION

BACKGROUND OF THE INVENTION

The present invention relates generally to apparatus for filtering particulate matter from a fluid flow, and more particularly pertains to the structure of a system for filtering radioactive particles from coolant associated with a nuclear reactor.

It is common practice in a nuclear power plant to utilize demineralized water in a coolant pool as a heat transfer medium around the core of the reactor. It is also common for the pool water to be contaminated by corrosive by-products, taking the form of fine radioactive particles. These particles are commonly referred to in the industry as "CRUD", an anacromyn for Clinch River Unidentified Deposits, a term coined in the industry to describe the usually black or gray highly radioactive particles that were first noted in the very early experimental light water reactors, most notably at the Clinch River facility of the Tennessee Valley Authority. Such CRUD deposits are a primary source of occupational radiation exposure in a nuclear facility and pose a continuing problem that must be dealt with by continuous filtration.

Other systems have been devised for filtration removal of particulate matter from the nuclear reactor coolant fluid. Representative of apparatus of such a system is the subject matter disclosed in U.S. Pat. No. 3,890,233 and in U.S. Pat. No. 4,883,588. A common problem associated with such systems involves the procedure for exchange or change-out of filter cartridges which are designed to entrain the particulate matter from the coolant processed through the cartridge media. Once a filter cartridge has accumulated and entrained a high density of radioactive particles, handling the spent cartridge and its safe removal is a severe problem due to its intense concentration of CRUD and its associated high radiation level.

Despite systems for particulate filtration that have been contributed by the prior art, there remains a need for apparatus for coolant filtration in a nuclear facility capable of containing a multiplicity of disposable filter cartridges disposed within a containment vessel to simultaneously receive contaminated coolant which is cleansed by the filters and expelled back to its pool of origin, and to provide such apparatus with the capability of relatively rapid and safe filter cartridge exchange during apparatus shut-down.

In other non-nuclear industries, systems have been provided for multiple cartridge filtration of fluids used in food, chemical, pharmaceutical, and general manufacturing industries. The apparatus of such a system is disclosed in U.S. Pat. No. 4,257,888, however, such a system does not address the specific problems associated with personal exposure to high levels of radiation emitted from the concentration of CRUD, also known as Radwaste, collected by the use of high-efficiency filtering media.

Accordingly, it is a general objective of this invention to provide improved apparatus for filtration of radioactively contaminated coolant of a nuclear reactor.

It is also an objective of the present invention to provide such coolant filtration apparatus that is capable of significantly extended filtration run time and which can be rapidly and safely serviced during non-operative down time and then quickly restored to its functioning mode.

It is a further objective of the present invention to provide apparatus for radioactive particulate filtration which uses a significantly large number of commercially available filter cartridges to simultaneously obtain an improved high level of particle removal efficiency.

Other objectives and desirable characteristics of the present invention will become apparent from the ensuing detailed description of the invention when read in reference to the accompanying drawings.

SUMMARY OF THE INVENTION

This invention comprehends apparatus which includes a substantially large stationary vessel defining an interior chamber in which a basket-like turntable structure is mounted on a vertical axis within the chamber. The turntable supports a large plurality of disposable filter cartridges standing vertically and in spaced-apart relation to each other in a special radial pattern relative to the central axis. Part of the turntable structure is a coolant distribution manifold adapted to sealably removably receive the upper ends of the filter cartridges. The manifold has a conduit section projecting centrally upwardly through the top wall of the vessel and in improved flow communication with an inlet which conducts coolant from a coolant pool. The incoming coolant flow passes downwardly through the conduit section and then radially outwardly through a distributor section and thence into the filter cartridges which have their intake ends in sealed connection with the distributor section. The coolant flow passes through the filtering media within the cartridges and thence radially outwardly into the chamber of the vessel whereby, once the chamber's vessel is totally filled, the filtered coolant is piped outwardly through a discharge port on the vessel and back to the pool.

During the time that the apparatus of the invention is being utilized for continuous coolant filtering, the turntable structure on which the filter cartridges are supported is maintained in a predetermined fixed position until it is determined through a test procedure that the entrained particulate matter within the cartridges has reached a predetermined level, requiring cartridge replacement. The replacement or cartridge change-out procedure involves curtailment of the coolant flow to the vessel and complete evacuation of coolant from the vessel through a drainage port. Additional structure on the vessel, which may be broadly described as gate means, allows manual or mechanized use of special tools during change-out to accomplish repositioning of the turntable structure followed by removal and replacement of spent cartridges.

More specifically, a first gate means, preferably a substantially large ball valve mounted on and centrally above the vessel top wall, permits downward insertion of a tool for controlling limited movement of the turntable structure. A second gate means preferably comprises a plurality of identical ball valves which are mounted, relative to the turntable structure, in a specific predetermined pattern across the top wall of the vessel and which enable cartridge manipulation during change-out. A third gate means is preferably a plurality of ball valves mounted in a special alignment pattern below the turntable structure and on the underside or bottom wall of the vessel, which permit the passage therethrough of filter cartridges during the change-out procedure.

A feature of the present invention is that it can be almost constantly performing its coolant filtering action which is interrupted only by infrequent down time periods for full filter cartridge renewal and limited servicing.

BRIEF DESCRIPTION OF THE DRAWINGS

FIG. 7 is an enlarged elevational view in partial vertical section of a tool assembly first shown in FIG. 1;

FIG. 8 is a view in horizontal cross-section, taken along line VIII—VIII of FIG. 7;

FIG. 10 is an enlarged view in vertical section of a component of the apparatus shown in FIG. 4, and showing in phantom line representation the end of a tool for manipulating the illustrated component during apparatus servicing;

FIG. 11 is an elevational view of the tool end shown in FIG. 10;

FIG. 12 is a full view in horizontal cross-section, taken along line XII—XII of FIG. 10;

FIG. 13 is a full view in horizontal cross-section, taken along either of the two lines XIII—XIII of FIG. 10;

DETAILED DESCRIPTION OF THE PREFERRED EMBODIMENT

Structure of the Apparatus

Figure 1:
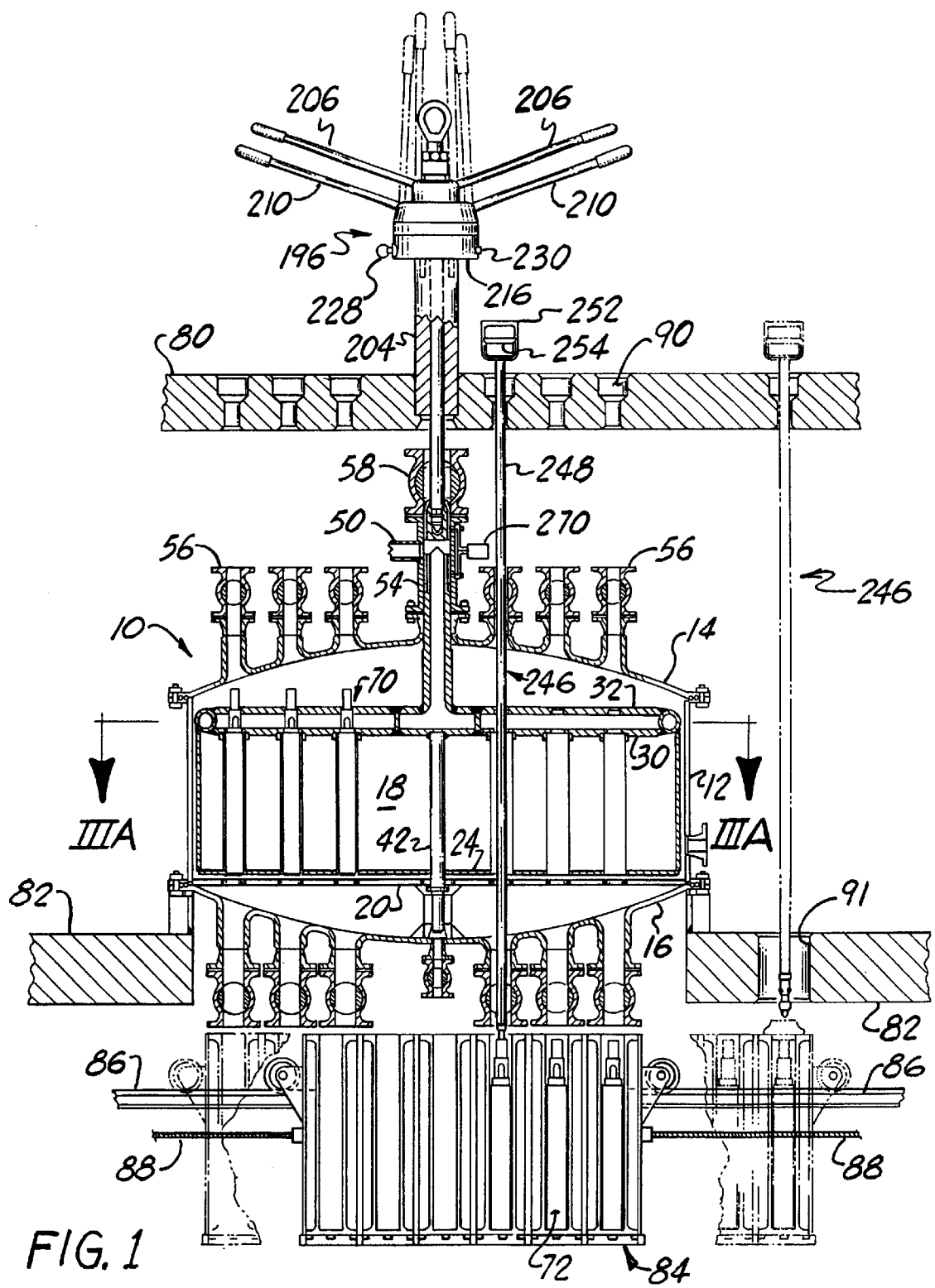
FIG. 1 is an elevational view in vertical section of the apparatus of the present invention, showing the apparatus situated in its stationary operative position.
Figure 2:
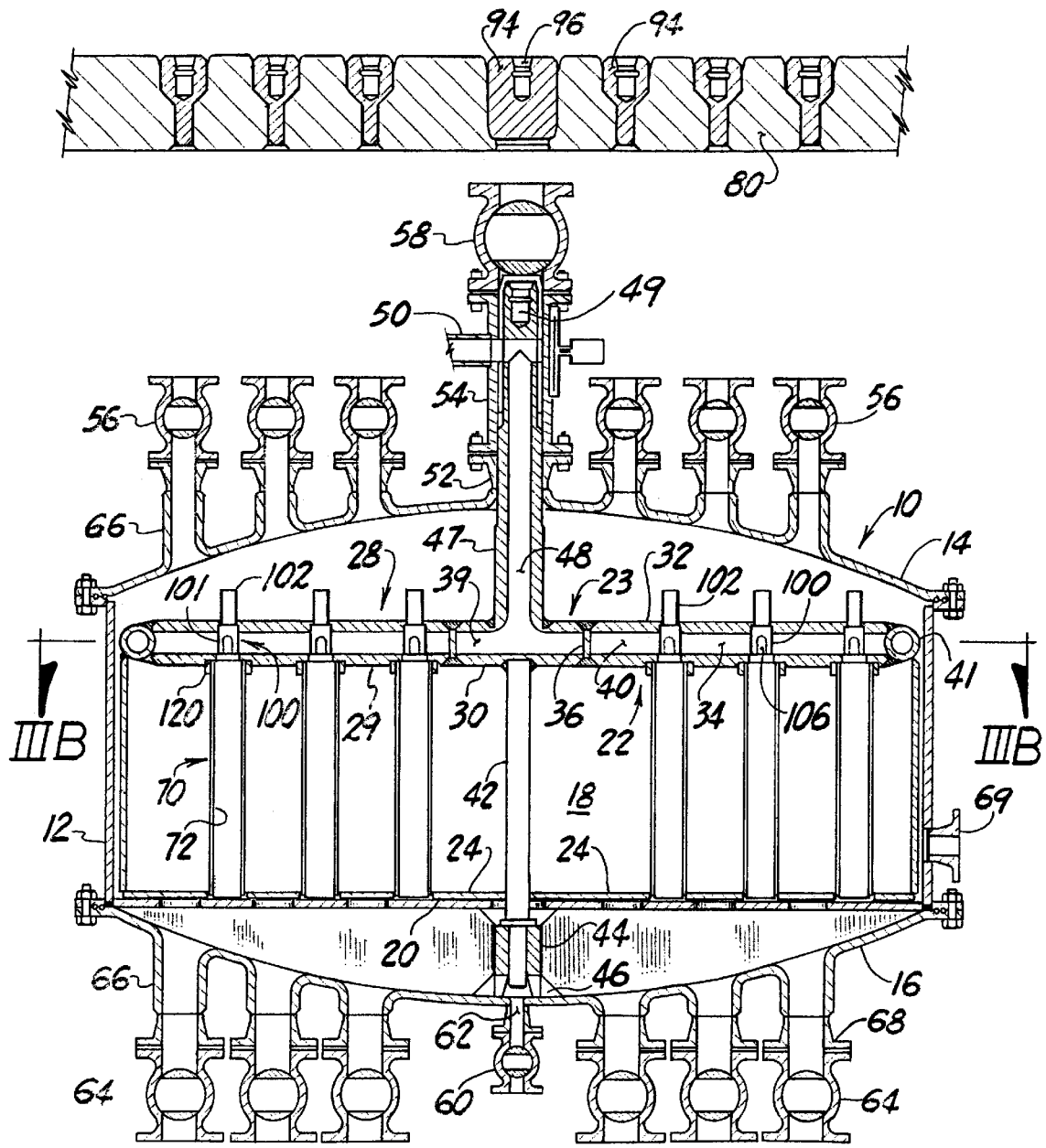
FIG. 2 is an enlarged view in vertical section of specific components first shown in FIG. 1.

Referring first to FIGS. 1 and 2 of the accompanying drawings, the apparatus of the present invention comprises a substantially large vessel 10 having a continuous circular sidewall 12, a concavo-convex upper or top wall 14, and an oppositely-disposed, downwardly-domed bottom wall 16.

The vessel structure defines an interior chamber 18. Transversely within the chamber is a rigid planar partition 20 that is permanently fixed around its continuous circular edge to the inside surface of the sidewall 12. Mounted within the chamber 18 is a rigid basket-like structure, herein referred to as a turntable 23, which includes a floor member 24 having a circular shape and a diameter slightly less than that of the partition 20 on which it normally rests. Extending upwardly from the outer circumferential edge of the floor member 24 is a plurality of rigid vertical struts 26 which are welded to and supporting a mani-fold assembly 28.

The manifold assembly comprises a distributor 29 formed by coextensive upper and lower circular plate members 30 and 32 which define therebetween a space 34. The space 34 is divided by a partition 36 into a radially-inward or central compartment 39 and a radially-outward, comparatively larger compartment 40. The outer peripheral edge of the distributor 29 is a toroidal ring 41 (best shown in FIGS. 3A and 3B) which is weldably joined to the outer circumferential edges of the plates 30 and 32 and thereby constitutes the outer wall of compartment 40.

The turntable 23 also includes, projecting centrally downwardly from the underside of the distributor 29, a vertical axle 42 (see FIG. 2) which is weldably joined at its upper end to the upper side of plate 30. The axle 42 extends downwardly through the turntable floor 24 and the partition 20 into a sealed bearing or journal 44 mounted on the inside surface of the vessel bottom wall 16 by a mounting spider 46.

Figure 4:
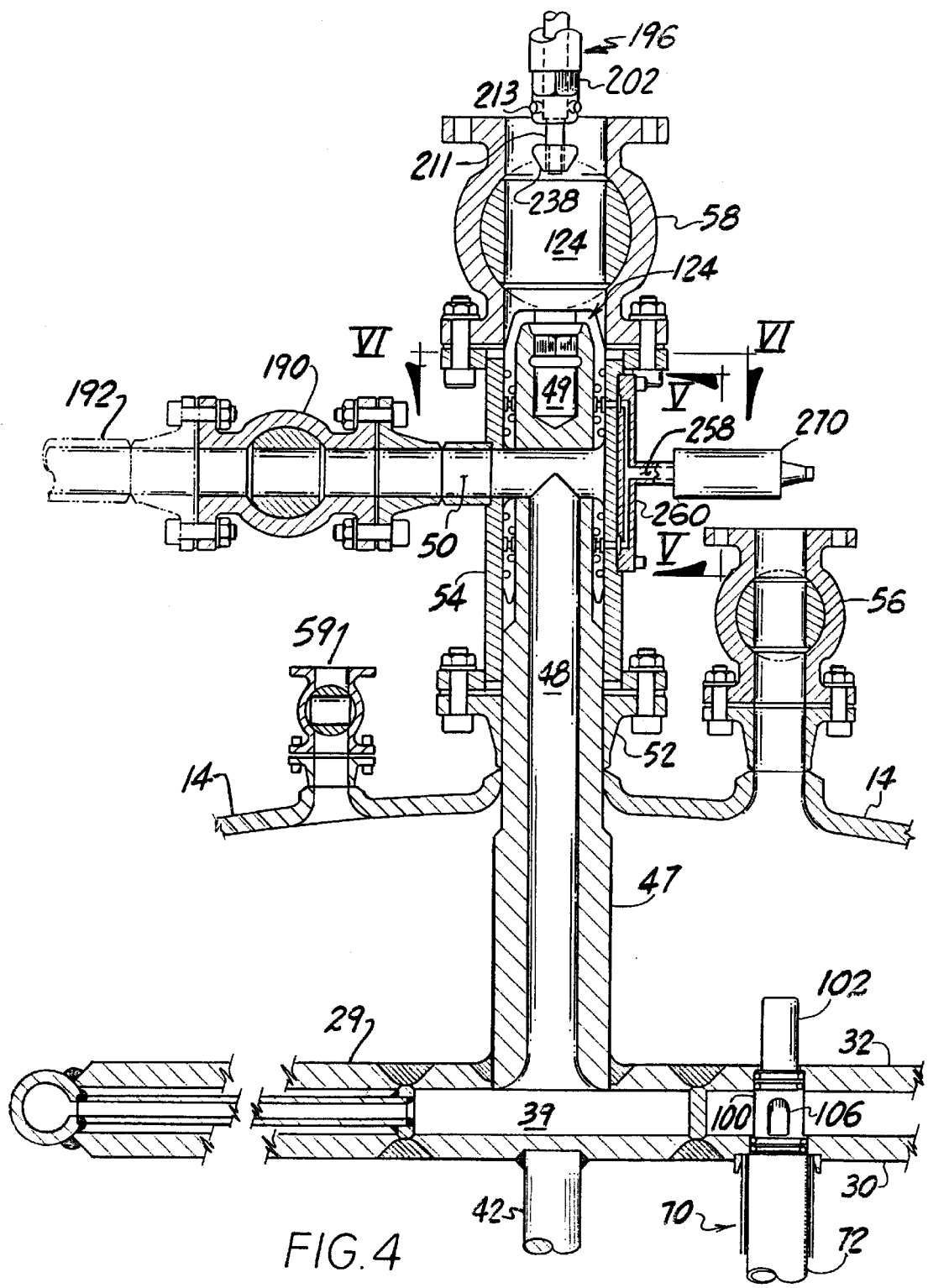
FIG. 4 is an enlarged partial elevational view in vertical section of certain components of the apparatus first shown in FIGS. 1 and 2.

With reference to FIGS. 2 and 4, it will be seen that directly above the axle 42 a linear conduit section 47, which is part of the distributor 29, projects upwardly through the vessel upper wall 14. The conduit section 47 has a central bore 48 which extends from, and in sealed flow communication with, compartment 39. The upper end of the conduit 47 has a closed solid portion in which a socket cavity 49 is provided for a purpose which will be hereinafter described. Below the level of the socket cavity 49, the conduit section 47 extends through a flange 52 mounted on the top wall 14 of the vessel 10, and, further, upwardly through an elongated collar 54 having a laterally-projecting inlet collar 50 which provides an entry port to bore 48 of the conduit section 47.

As shown in FIG. 2, a plurality of identical ball valves 56 are mounted on the top wall 14. A comparatively larger ball valve 58 is mounted at the upper end of the elongated collar 54. A single bleeder ball valve 59 is mounted on the top wall 14 in flow communication with the chamber 18 (FIG. 4). Mounted on and projecting downwardly from the bottom wall 16 is a ball valve 60 in flow alignment with a bore 62, and a plurality of identical ball valves 64. Specifically, as shown in FIGS. 1 and 2, there are six of the ball valves 56 and six of the ball valves 64, with each of these ball valves being supported in fixed sealed relation on a boss 66 structurally formed as an integral part of the respective top and bottom walls 14 and 16. Each boss 66 terminates in a flange 68 which accommodates ball valve sealed connection thereto. Each ball valve 64 on the underside of the vessel 10 is disposed in axial vertical alignment with, and is larger than, corresponding ball valve 56 thereabove. FIG. 2 also illustrates a port 69 on the vessel sidewall 12 which serves as an outlet from the chamber 18.

Within the chamber 18, securably mounted on the turntable 23, is a plurality of filter cartridge assemblies 70. Each assembly 70 includes (see FIG. 18) a disposable filter cartridge 72 with an input neck 73 which is in fluid flow communication with the distributor 29 (See FIG. 4) of the manifold 28. Further details of the preferred filter cartridge assembly and its securement on the turntable 23 will be set forth in an operational description of the invention appearing hereinafter.

It should be noted with reference to FIG. 1 that the vessel 10 is intended to be situated in a nuclear facility adjacent a coolant pool (not shown) from which coolant is to be withdrawn for filtration through the disclosed apparatus. It is intended that the vessel 10 be appropriately shielded in accordance with established safety requirements and, accordingly, a separate room may be provided within the nuclear facility to house the apparatus of the invention and associated equipment, and various means of mounting the vessel in place may be considered. In the installation shown in FIG. 1, two levels of steel deck plates 80 and 82 are provided for supporting the vessel 10 and associated equipment. Below deck plate 82 and beneath the vessel 10 is a wheeled disposal cart 84 mounted on a rail 86 and controlled by a draw cable 88. The cart 84 is preferably provided with a plurality of interior compartments or shielded cells for receiving spent contaminated cartridges in accordance with the operation of the apparatus shown in FIG. 1. A wheeled cart 84 may also be utilized to deliver new replacement filter cartridges to be installed within the chamber 18, as will be hereafter explained.

The rigid mounting plate 80, as shown in FIG. 1, is provided with openings or bores 90 to accommodate extension therethrough of manipulating tools during certain steps of the operation of the apparatus, and the plate 82 therebelow is provided with a similar opening 91 to enable selective testing of the radioactive level of contaminated filter cartridges contained in the cart 84. The bores 90 are provided with plugs 94 (FIG. 2) adapted to be removed from the plate 80 to permit insertion of manipulating tools required for filter cartridge replacement.

Figure 3A:
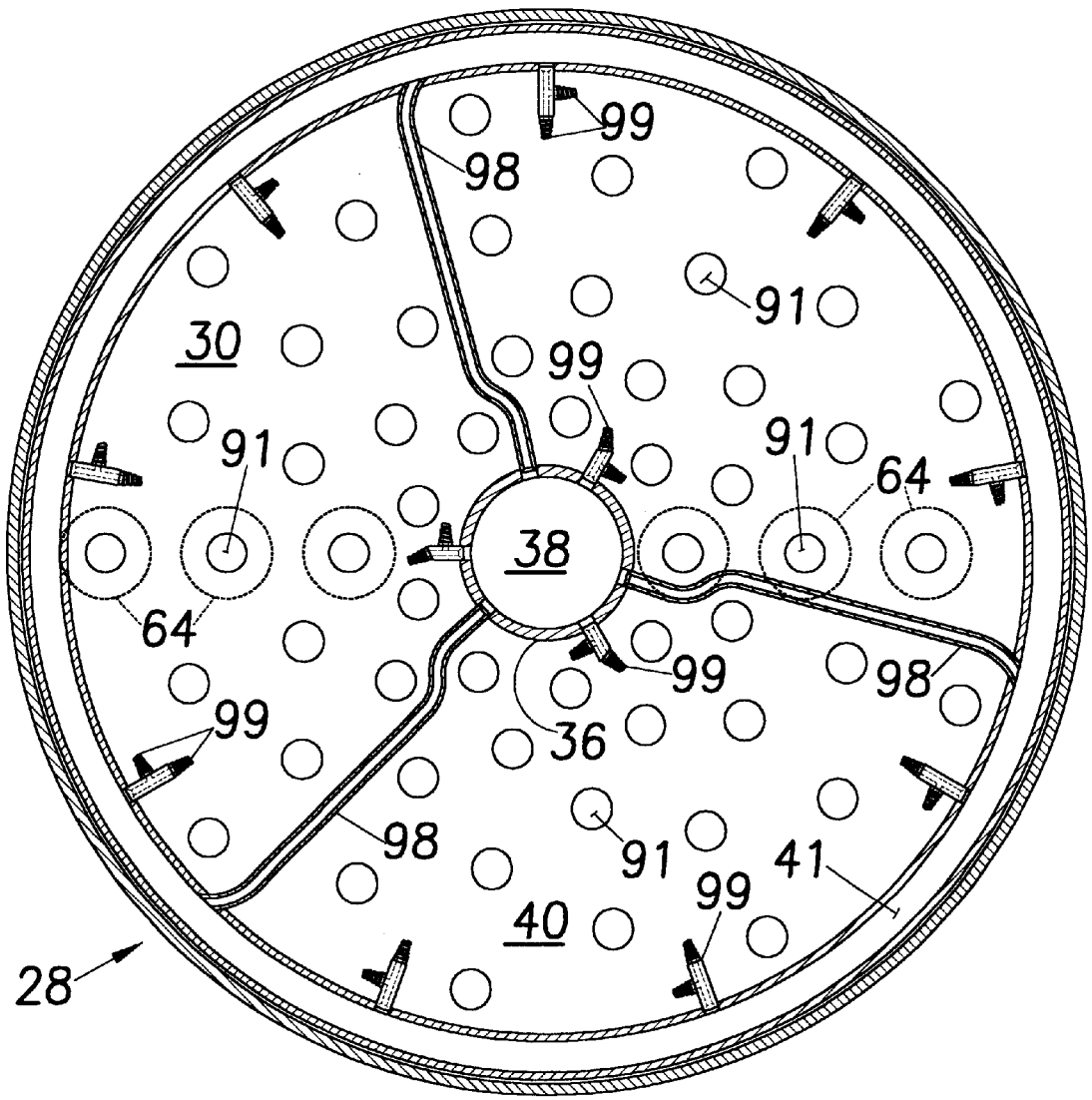
FIG. 3A is an enlarged view in horizontal cross-section, taken along line IIIA—IIIA of FIG. 1.
Figure 3B:
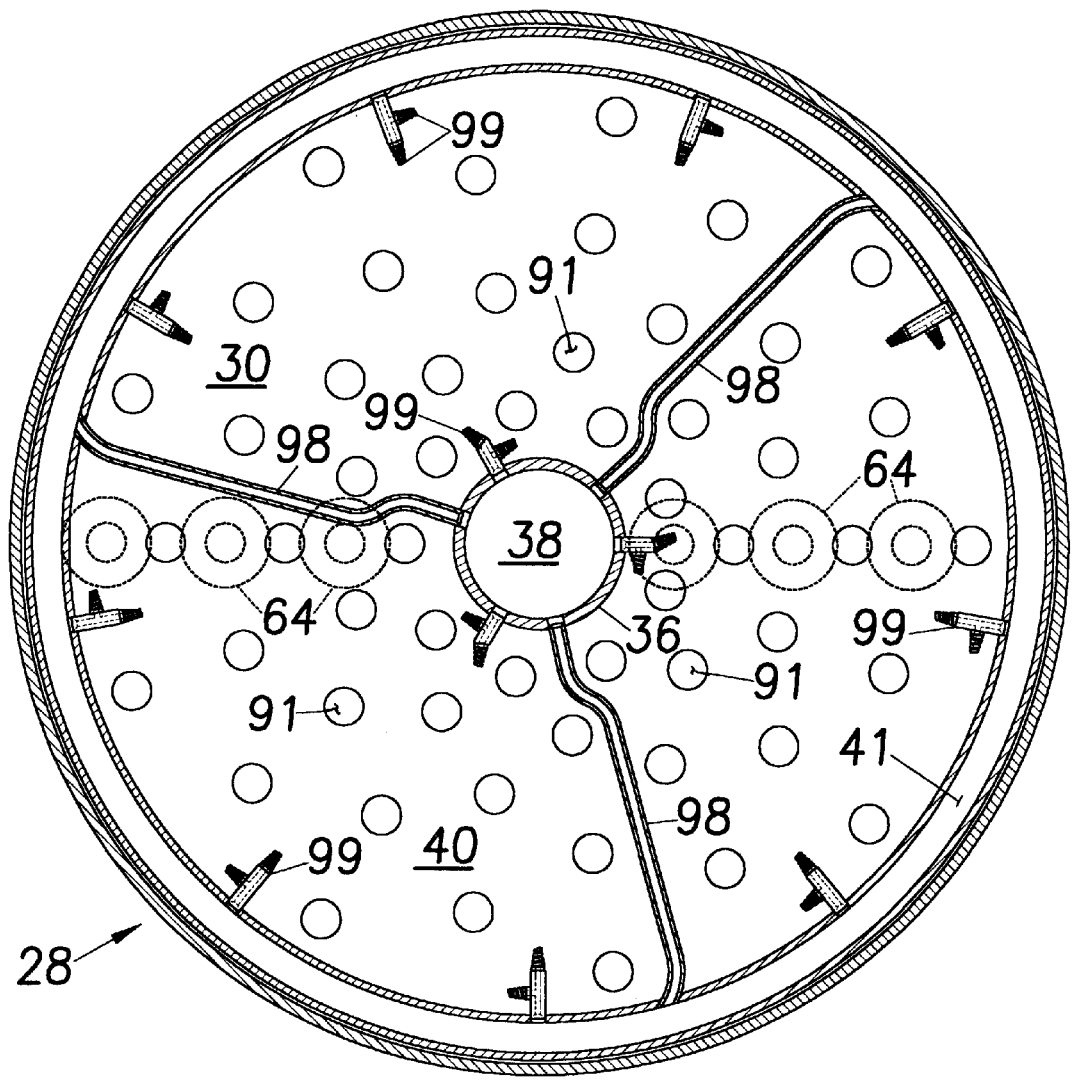
FIG. 3B is a view in horizontal cross-section of a component of the apparatus shown in FIG. 2, taken along line IIIB—IIIB of FIG. 2.

FIGS. 3A and 3B illustrate further structural details of the distributor 29 of the manifold assembly 28 first shown in FIGS. 1 and 2. The turntable 23, in this presently preferred embodiment of the apparatus, will support a total of fifty-four cartridge assemblies 70. Accordingly, FIGS. 3A and 3B show fifty-four openings or circular apertures 91 which are identical in size to each other and corresponding in number to the number of filter cartridge assemblies to be utilized in the apparatus. The top plate 32 of the distributor 29 (see FIG. 2) is provided with the same number of apertures 91 as bottom plate 30 and in the same pattern thereon whereby each aperture in the bottom plate 30 is in vertical alignment with a corresponding aperture in top plate 32. FIGS. 3A and 3B also illustrate that the partition 36 and the toroidal ring 41 are provided with a specifically spaced plurality of bifurcated nozzles 99 which project into the compartment 40 of the distributor 29.

Figure 20:
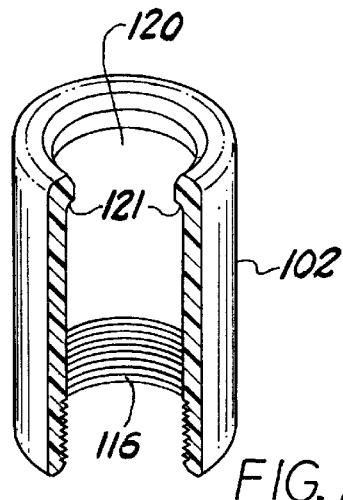
FIG. 20 is a perspective view, partially cut away, of a component of the adapter assembly illustrated in FIG. 18.
Figure 19:
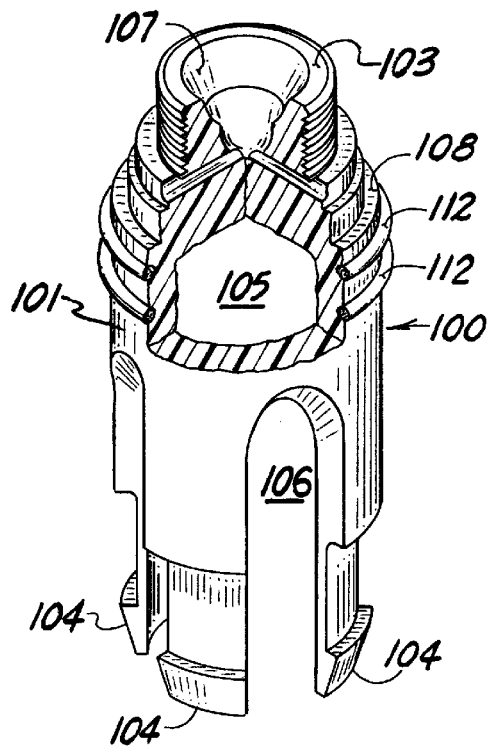
FIG. 19 is a perspective view, partially cut away, of a component of an adapter assembly illustrated in FIG. 18.
Figure 18:
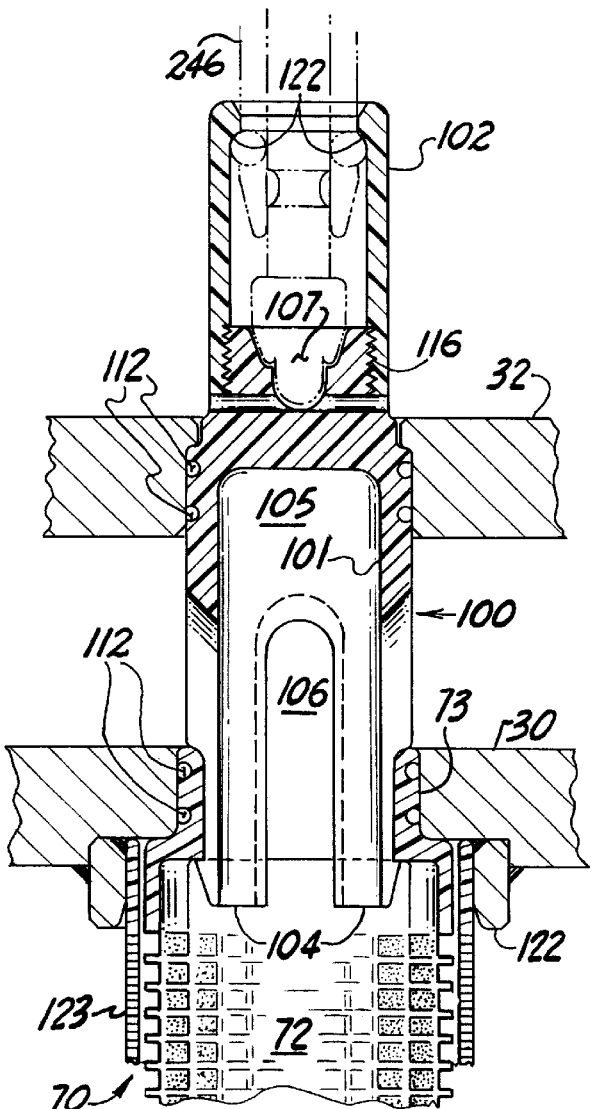
FIG. 18 is an enlarged partial view in vertical section illustrating a filter cartridge assembly first shown in FIGS. 1 and 2.
Figure 21:
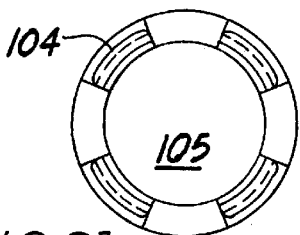
FIG. 21 is a bottom plan view of the component shown in FIG. 19.

The manner in which the filter cartridge assemblies 70 are secured to the distributor 29 is best shown in FIGS. 4 and 18. Each filter assembly 70 preferably includes an adapter 100 comprising a body member 101 and a collar member 102 (FIGS. 19 and 20). The body member 101 is preferably high quality plastic and has an integral, outwardly-threaded neck portion 103 at one end thereof, and integral spaced-apart fingers 104 at its opposite end. Within the body member 101 is a cavity 105 which opens to the space between the fingers 104, and within the neck portion 103 is a tool-accommodating cavity 107. The body member 101 has a stepped annular outside configuration that forms a shoulder 108 and spaced-apart annular grooves in which are carried compressible O-ring seals 112. The collar member 102 has internal threads 116 at one end of a central bore 120 which enables the body member 102 to be firmly screwed onto the neck portion 103 of the body member 101. At the end of the collar member 102 which is opposite its threaded end, an inwardly-projecting annular ridge 121 is formed as an integral part of the collar member.

With respect to each filter cartridge assembly 70, as shown best in FIG. 18, there is a rigid annular ring 122 set into an accommodating groove on the underside of plate 30. The ring 122, which is welded to the plate 30, serves as a permanent socket for a removably-insertable, rigid tubular screen structure 123. The screen structure 123 acts as a cage in which the filter cartridge 72 is contained and is adapted to be removed or replaced independent of the filter cartridge. The preferred embodiment of the filter cartridge to be utilized in the disclosed apparatus is closely similar to a filter cartridge which is presently commercially available (not shown) comprises coextensive inner and outer tubular cage members defining a full-length annular space therebetween which contains layers of pleated fibrous permeable filter media. The filter body has an input end with an opening to the inner cage member and an opposite fully closed end sending a circular sealing gasket thereacross. A coolant flow directed into the inlet end fills the core and is forced radially outwardly to exit through the outer cage. The filtering media is designed to capture and entrain small CRUD particles carried in the coolant flow processed through the cartridge body. The structure of a commercial filter would be modified in production, in accordance with the present invention, to have permanently affixed to its inlet end an inlet neck 73 having spaced-apart annular grooves on its outside surface to receivably accommodate a pair of the O-ring seals 112.

FIGS. 4–13 illustrate details of the structure at the upper end of the vessel 10 (first shown in FIGS. 1 and 2) which extends upwardly from above the distributor 29 and through the vessel top wall 14. The solid upper end of conduit section 47 is contained within a sleeve 124 shown in detail in FIG. 10. The sleeve 124 has an upper end 126, a downward open end 128, and four circular side openings, only three of which are shown, namely, openings 130, 134, and 136. The aforementioned side openings are arranged in a quadrant pattern around the sidewall of the sleeve 124. At the upper end of the sleeve 124 is an opening 138 for accommodating extension therein of a manipulating tool 140 having a nose or working end 142. The sleeve 124 is fitted over and contiguous to the outside surface of the upper solid end of conduit section 47 and occupies the space between the section's upper end and the inside surface of the collar 54, as shown in FIG. 4. The sleeve 124, in its installed position, as shown in FIG. 4, acts as a removable sealing member, and has vertically spaced-apart inside surface grooves accommodating O-ring seals 156, 158, 160, and 162, as well as spaced-apart outside annular grooves accommodating annular O-ring seals 166, 168, 170, and 172. Between pairs of the outside O-ring seals on the sleeve 124 are spaced-apart annular grooves 180. Each groove 180 is provided with spaced-apart apertures 182, all of which open to the inside of the sleeve 124. It should be noted that the apertures 182 are disposed in an annular arrangement within the sleeve 124 between pairs of the inside O-ring seals.

FIG. 4 also illustrates that the inlet or port 50 is in flow communication with a ball valve 190, and that the large ball valve 58 permits the downward extension therethrough of a tool 196 for engagement into the socket cavity 49 formed in the closed upper end of the conduit section 47.

Additional structural details and features of the apparatus of the present invention will be explained hereinafter in relation to the systematic function of the apparatus.

Operation of the Apparatus

The operation of the apparatus is hereinafter described with reference to two separate modes; the first being the dynamic coolant filtering mode, and the second being the static shut-down mode. For the dynamic mode, it should be assumed that a bank of new clean filter cartridge assemblies are contained within the chamber 18 in their mounted position as shown in FIG. 2, and that all ball valves on or leading to the vessel 10 are closed except for inlet valve 190 and bleeder valve 59, and the end of a conduit 192 is coupled to the inlet side of the ball valve 190 (FIGS. 2 and 4). A heavy-duty pump (not shown) is used to pump a pressurized flow of coolant from a coolant pool and to the apparatus through the conduit 192 and inward through the port 50. The coolant flow, which may be at a pressure of 150 psi, progresses through the inlet 50 and downward through the bore 48 of the conduit section 47. The coolant flow then passes into the distributor 29 of the manifold assembly 28 where it fills the compartment 39. From the compartment 39, the pressurized flow progresses outwardly through the triskelion pipes 98 (See FIGS. 3A and 3B) and into the toroidal ring 41. The bifurcated nozzles 99, by their disposition and design, direct the pressurized coolant flow from the compartment 39 and the toroidal ring 41 into the substantially large compartment 40 of the distributor 29 as a sweeping, highly-turbulent flow that is dispersed and forced to enter the inlet end of the filter cartridges carried on the turntable 23. More specifically, the coolant flow enters the filter cartridges through the side openings 106 of the adapter body 101 on each filter cartridge assembly. The coolant passes downwardly through the body of the filter cartridges 70 and is radially discharged therefrom and into the chamber 18 and, ultimately, the chamber 18 is completely flooded with the filtered coolant.

FIGS. 2 and 3B illustrate the disposition of various elements of the apparatus in its dynamic mode, whereas FIGS. 1 and 3A illustrate the disposition of various elements of the apparatus during its static mode.

It should be noted that ball valve 59 is representative of any type of suitable bleeder valve that would be employed to bleed air from the chamber 18 as it is displaced by coolant which will fill the entire chamber following commencement of the filtering operation. Appropriate means (not shown) would be utilized to sense and signal when the chamber 18 is filled with coolant whereby the bleeder valve would be closed.

During the use of the apparatus for the filtering process, the filled chamber becomes an internally pressurized vessel, forcing the coolant flow outwardly through the port 69 and thence through a conduit (not shown) coupled thereto, which leads back to the coolant pool. The port 69 may be alternatively located, for example, on the underside of the bottom wall 16 or it may be dispensed with altogether in favor of utilizing a larger ball valve in place of ball valve 60 as a means of conducting coolant from chamber 18 and back to the pool.

The pressurized flow heretofore described is continued until such time as the filter cartridges become so impacted with radioactive particulate matter that they are no longer effective for further filtering. A periodic test procedure (not herein described) may be conducted on the coolant discharge from the vessel to determine the condition of the filtered coolant, or a spent cartridge may be subjected to test (as hereafter further explained) to determine when the filters 70 have become overburdened to the point where replacement is required.

Apparatus Shut-Down and Filter Cartridge Exchange

Operation of the apparatus of the invention is bimodal. A first condition or dynamic mode of operation involves utilization of the apparatus for continuous filtering of coolant, and a static mode or condition is when coolant flow through the apparatus is curtailed to enable expulsion of spent filter cartridges and their replacement. Utilizing the apparatus for its dynamic mode requires closure of all ball valves of the apparatus except valve 190 (FIG. 4) and a valve on port 69 (FIG. 2) are opened to permit coolant flow through the apparatus. For this operational description, it is assumed that a bank of new clean filter cartridges are contained within the chamber 18 in their mounted position as shown in FIG. 2, and that the end of a conduit 192 (FIG. 4) is connected in sealed flow communication with valve 190. A heavy-duty pump (not shown) is used to pump a pressurized flow of coolant from the coolant pool and inward through the valve 190 at a pressure of approximately 150 psi. The coolant flow progresses through the inlet 50 and downward through the bore 49 of the conduit section 48 to the distributor 29. The coolant flow from the bore 48 initially enters the compartment 39 (FIG. 2) and is distributed radially outwardly through triskelion pipes 98 and the three bifurcated nozzles 99 projecting radially outwardly from the compartment 39 (FIG. 3B). The coolant flow moving through the pipes 98 enters the toroidal ring 41 and is then discharged from there into compartment 40 of the distributor 29 by means of the inwardly-projecting bifurcated nozzles 99 located in spaced-apart relation around the inside circumference of the toroidal ring 41. The design and disposition of the bifurcated nozzles 99 result in a coolant flow entering the compartment 40 of the distributor 29 swift high-velocity turbulent flow which is distributed into the upper ends of the filter cartridge assemblies, through openings 106 of the adapter 100 (FIGS. 2 and 18). The coolant flow progresses downwardly through the filter cartridges 72 and is expelled radially outwardly from all the cartridges into the space of the chamber 18. Here it should be noted that valve 59 (FIG. 4) is utilized to evacuate air from the chamber 18 until such time as the chamber fills to capacity with filtered coolant whereby it acts as a pressure vessel to force the flow out through port 69. The particular form of the valve 59 may be altered and it may be provided with sensing means to determine when chamber 18 has been fully evacuated of air and filled with coolant whereby it will automatically close so that the only open valves are valve 190 and the valve which would control output at port 69.

Here it should be noted that FIGS. 2 and 3A show the disposition of the turntable 23 during the dynamic filtering operation, whereas, FIG. 1 shows the turntable 23 in a slightly elevated and static position within the chamber 18 consistent with filter cartridge replacement as will be hereafter described. It is intended that the dynamic mode of the operation be maintained until the filter cartridges become uniformly loaded with particulate matter whereby cartridge change-out becomes necessary.

The first step in cartridge change-out is shut-down of the pump between the apparatus and the coolant pool enclosure of valve 190. Then valve 59 would be opened for a short period to permit air entry into the chamber as residual coolant is being drained outwardly from the chamber. For chamber drainage, valve 60, which would be in sealed fluid flow connection to a conduit leading back to the coolant pool, is opened so that substantially all of the coolant in the lower end of the chamber is drained therefrom.

Examination of FIG. 2, particularly the disposition of the floor 24 of the turntable and the partition 20 suggests that during the coolant filtering process, coolant expelled into the chamber 18 from the cartridges 72 would be unable to flow downwardly to the area of the chamber below the partition 20, however, both floor 24 and partition 20 are provided with openings or slots (not shown) in their respective areas adjacent the axis 42 whereby the coolant flow may progress downwardly into the area of the chamber beneath the partition 20.

For filter cartridge change-out, turntable 23 is mounted to be incrementally rotated on its axis to bring the spent filters carried on the turntable into successive positions of alignment with the gate valves 56 above the turntable and the aligned valves 64 below the turntable. FIG. 3A shows that openings 91 in the plates 30 and 32 with reference to FIG. 3A it will be seen that openings 91 are positioned with six spaced-apart openings along a radius R1 (herein described as a row of openings 91). Going either clockwise or counterclockwise on FIG. 3A, it will be seen that a new radial row of openings is provided every twenty degrees but that the next radial row from line R1 has its openings 91 offset and moved closer to the midpoint of the distributor. Accordingly, every other radial row has its openings 91 positioned at the same distance from the center as the previous alternate row. FIG. 3A shows that ball valves 64 on the underside of the vessel 10 (FIG. 2) are in vertical alignment beneath a radial row of openings 91 in plate 30. Hence, rotation of the turntable forty degrees as viewed in FIG. 3A will move a radial row of the openings 91 into vertical alignment above the row of ball valves 64 therebelow. With a radial row of openings 91 in vertical alignment with the ball valves 64 as shown in FIG. 3A, a filter cartridge change-out procedure may be performed with reference to six of the filter cartridges, and incremental rotation of the turntable through successive forty-degree sweeps will allow cartridge filter replacement with respect to each radial row of cartridges until all fifty-four cartridges in the apparatus have been replaced.

The first step in the change-out procedure is to advance the turntable from the operative position shown in FIG. 3B to the first of nine change-out positions such as shown in FIG. 3A. A special tool assembly 196 is brought into position above the ball valve 58 (FIGS. 4 and 7). The tool assembly 196 comprises an elongated tubular member 202 extending downwardly through a cylindrical block 204. A rigid hook member 205 is provided at the upper end of the assembly 196 to enable it to be crane manipulated, and a mechanism 206 is provided with levers 208 and 210 to enable manual rotation and lifting of the turntable within the chamber 18 of the vessel 10.

Extending centrally through the tool assembly 196 is a shaft 211. A sub-assembly 212 surrounds the upper end of the tool assembly 196 and is adapted to lift the tool 196 vertically in response to manipulation of levers 208. In addition, the sub-assembly 212 may be rotated, thereby rotating the tool 196, by applying a lateral force against either of levers 210. The nose or working end of tool 196 (see FIG. 4) is adapted to be inserted through the ball valve 58 and into the socket 49 whereby the flat side surfaces of a stationary nut 203 will insertably meet with the inside surface configuration of the socket 49, and a rotative motion applied to the tool 196 will be translated to the upper end of conduit section 47 to achieve rotational advancement of the turntable within the chamber 18. Tool 196 is further adapted to have radially-displaceable fingers 213 which are responsive to vertical movement of the shaft 211 whereby they will move outwardly and project into an annular inner sidewall slot of the socket 49 so that a force applied to levers 208 (FIG. 7) will impart a lifting motion to the turntable 23 within the chamber 18.

Figure 9:
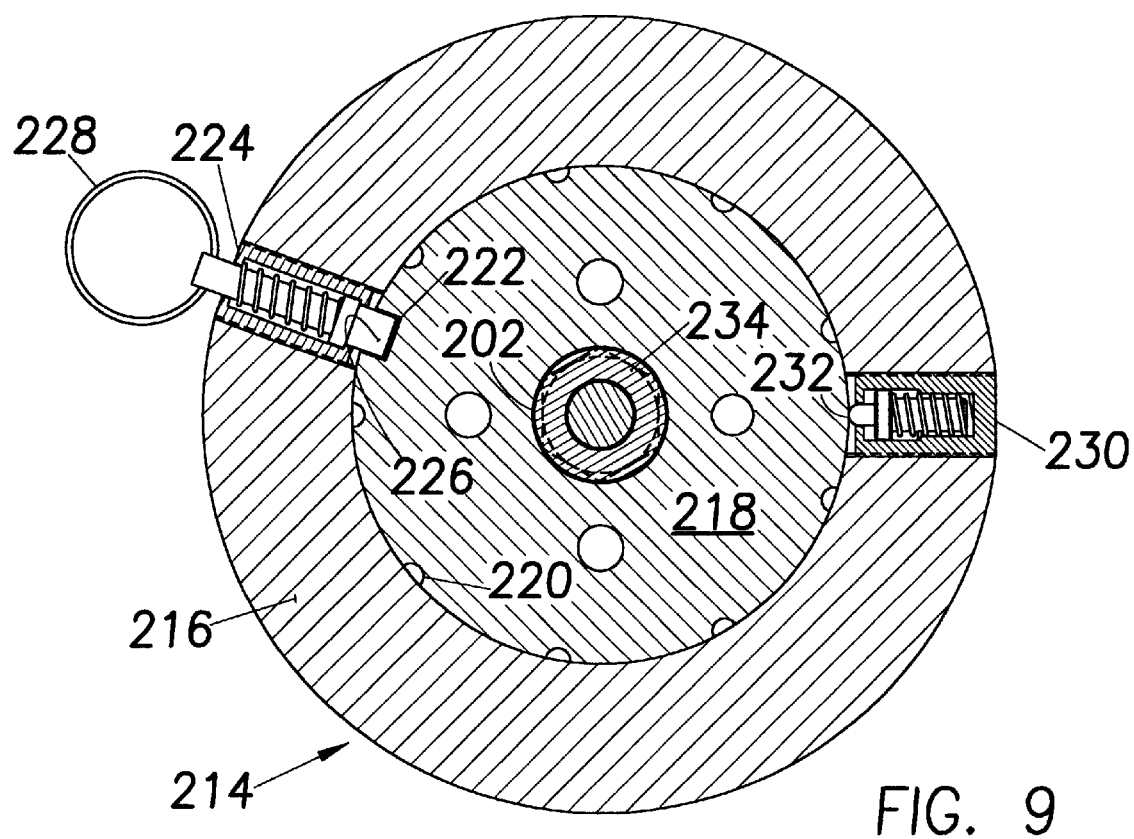
FIG. 9 is an enlarged view in horizontal cross-section from the tool assembly shown in FIGS. 1 and 7, taken along line IX—IX of FIG. 7.

The mechanism 206 further includes a cylindrical indexing mechanism (FIGS. 7 and 9) which operates to hold the turntable at specific discrete positions of rotational advancement during the filter cartridge change-out procedure. The indexing mechanism 214 comprises an outer ring member 216 which is rotationally slidably movable on the an inner ring 218 (FIG. 9). Ring 218 has nine circumferentially spaced-apart dimples 220 and a slot 222. A plunger mechanism 224 has a spring-biased plunger 226 which may be manually pulled radially outwardly by grasping ring 228. Also provided on the outer ring 216 is a plunger mechanism 230 having a spring-biased rounded plunger nose 232 for engaging in the dimples 220 of the ring 218.

During the filter cartridge change-out procedure, the tool assembly 196 enables an operator to incrementally turn the turntable in the chamber 18 on its axis through nine successive positions in order to successive align radial rows of filter cartridges carried on the turntable beneath the ball valves 56 and in direct vertical alignment with the ball valves 64 therebeneath (see FIG. 2). It should be noted that utilization of levers 208 of tool 196 will impart a slight lifting movement to the turntable 23 whereby it moves from the disposition shown in FIG. 2 to a comparatively higher position within the chamber, as shown in FIG. 1 so that floor 24 moves upwardly and away from contact with partition 20 within the chamber 18.

A relatively simple but specialized tool 246 is utilized to manipulate filter cartridges during the change-out procedure. The tool 246 comprises a tubular housing 248 enclosing a reciprocal shaft 250 having an upper end which is a bracket 252 having a handle 254 integral to the shaft 250. The working or nose end of the tool 246 is illustrated in FIGS. 14—18. The purpose of tool 246 is to enable an operator to manipulate filter cartridges within the chamber 18 without any need to actually see the tool engagement with the filter cartridge.

Figures 14, 15:
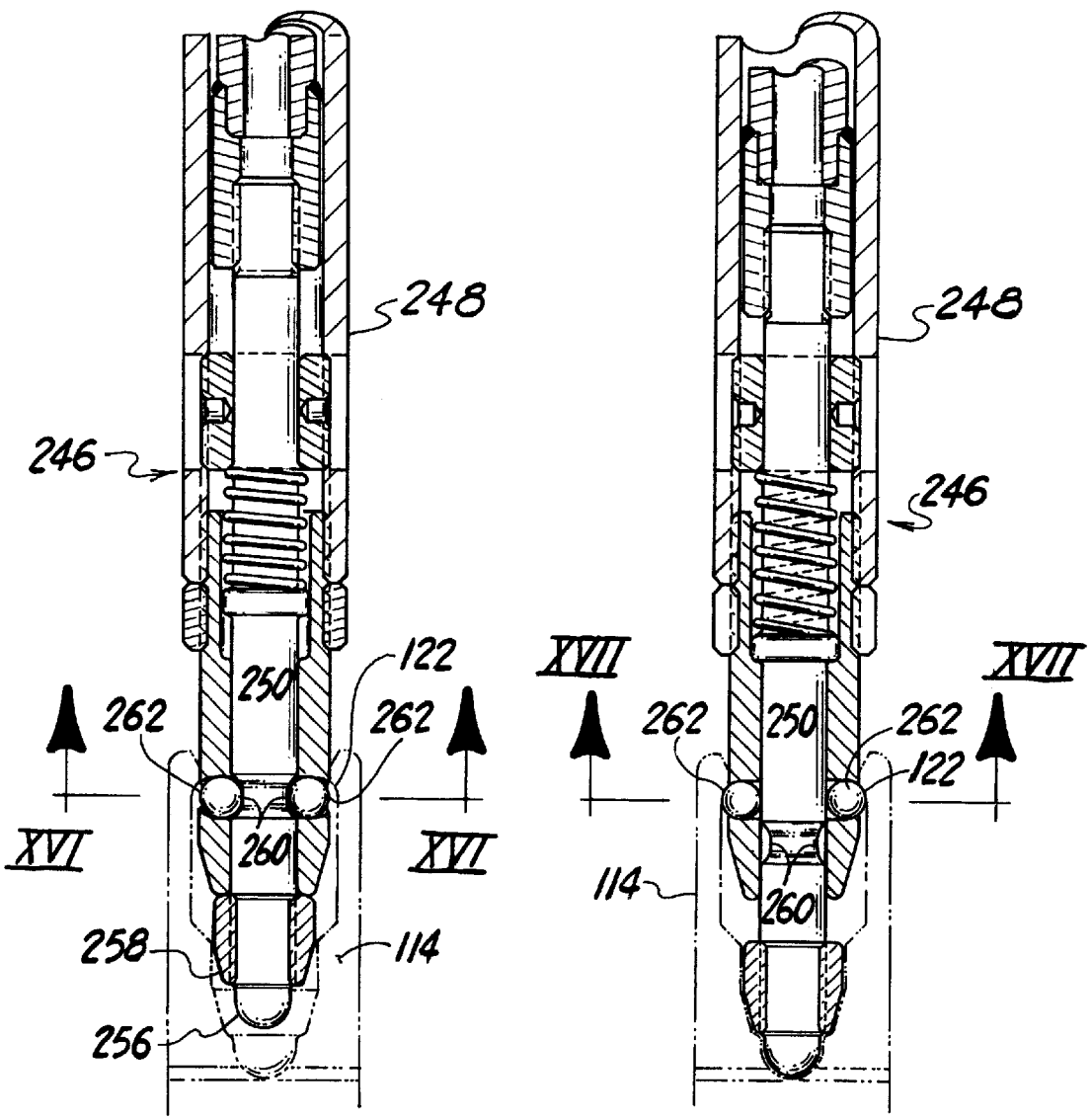
FIG. 14 is a partial view in vertical section of a filter cartridge change-out tool which constitutes ancillary apparatus of the present invention.
FIG. 15 is a view in vertical section of the filter cartridge change-out tool first shown in FIG. 14 and revealing the redisposition of certain of its parts in accordance with its use.
Figure 16:
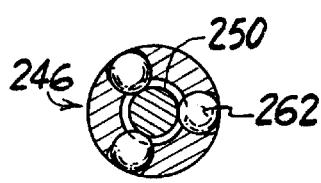
FIG. 16 is a full view in horizontal cross-section, taken along line XVI—XVI of FIG. 14.
Figure 17:
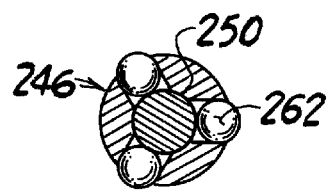
FIG. 17 is a full view in horizontal cross-section, taken along line XVII—XVII of FIG. 15.

Details of the nose or working end 256 of the tool 246 are shown in FIGS. 14 and 15. The end 246 is adapted to operatively interact with the collar member 102 of the adapter 100 (FIG. 18) whereby a downward manual force on the tool 246 will push the entire filter cartridge assembly 70 out of its sealed position on the distributor 29 and downwardly through the cage 123 and thence outwardly through the open ball valve 64 whereby the filter cartridge is deposited into the cart 84 (FIG. 1). The tool 246 has a fixed annular jacket 258 with an outer shape conforming to the cavity 107 of the adapter body 101 (FIG. 19), and there is an annular groove 260 on the shaft 250 which will enable balls 262 to move radially inwardly and outwardly, from the position shown in FIG. 16 to that which is shown in FIG. 17, as a function of manual retraction of the shaft 250 by a manual force applied to handle 254 (FIG. 7). Hence, the tool 246 can be utilized to push a spent filter cartridge out of its mounted position on the distributor 29, and to reach downwardly all the way through the vessel to engage a filter cartridge assembly and pull it upwardly into sealed position on the distributor of the turntable, by virtue of the balls 122 engaging under the ridge 121 of the collar 102. Complete filter change-out is accomplished by utilizing the aforedescribed procedure and, between each filter change-out step, rotatably advancing the turntable in accordance with the dimple pattern shown on ring 218 of FIG. 9.

As shown in FIGS. 1 and 7, tool 246 may also be utilized outside the vessel 10 to retrieve a spent filter cartridge for the purpose of determining its level of radioactivity.

A critical component of the apparatus of the present invention is the sleeve 124 shown in FIGS. 10–13 and, in its mounted position, in FIG. 4. Sleeve 124 serves to seal the upper end of the conduit section 47 with the inner wall of the collar 54 to thereby isolate the ball valve 58 from the coolant flow which enters through port 50 and is directed downwardly into the distributor 29 by the bore 48. As shown in FIG. 10, the sleeve 124 has inner and outer O-ring seals which prevent passage of coolant above the level of flow passage within the sleeve which is created by four openings in the sleeve wall disposed in a quadrant arrangement as openings 130, 132 (not shown), 134, and 136. The sleeve 124 is provided with upper and lower annular grooves 180 (FIG. 10) having circumferentially-spaced apertures 182 therethrough. The annular grooves 180 are in alignment with a channel arrangement 258 contained within a plate 260 of a test device 270, as shown in FIG. 4.

Figure 5:
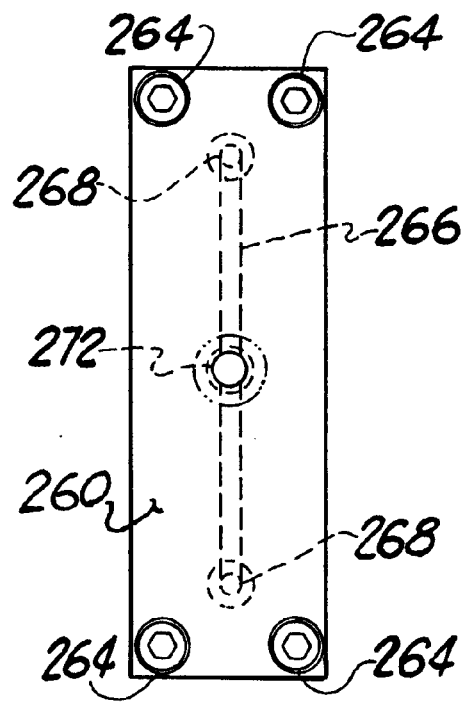
FIG. 5 is an enlarged side elevational view of a component of the apparatus shown in FIG. 4, as viewed from the vantage point of line V—V of FIG. 4.
Figure 6:
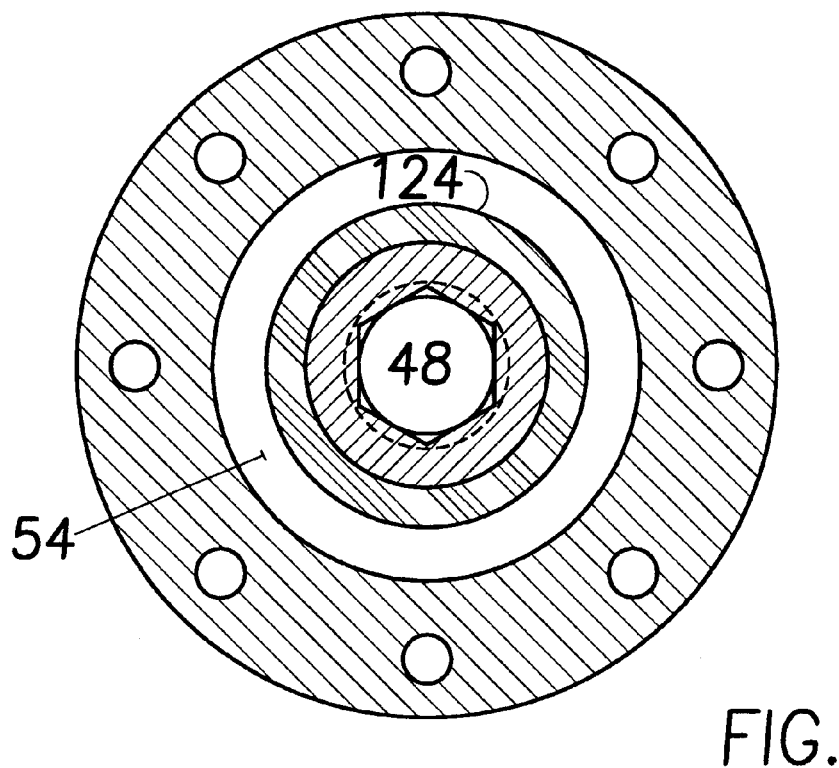
FIG. 6 is an enlarged full view in horizontal cross-section, taken along line VI—VI of FIG. 4.

The test device 270 is mounted laterally on the collar 54 by means of a flat plate 260 as shown in FIG. 5. Plate 260 is provided with corner openings to accommodate fasteners 264 for mounting the plate 260 in sealed relation against the sidewall of collar 54. Within the plate 260 is an internal longitudinal passage 266 communicating with openings 268 in the sidewall of collar 54 which, in turn, are in sealed flow communication with the annular grooves 180 of the sleeve 124 (FIG. 10). The coolant flow which enters through the port 50 (FIG. 4) and progresses downwardly through the bore 48 is prevented from moving upwardly or downwardly along the sidewall of the sleeve 124 by the O-ring seals, inner and outer, which serve to seal the sleeve 124 in place. In the event of any leakage of coolant, or even air, upwardly or downwardly along the body of the sleeve 124, such leakage would pass through the openings 182 into the groove 180 and thence through the passage 266 of the plate 260 (FIG. 5) and outwardly into the body of test device 270, which device may be a liquid or air pressure sensitive means of detecting and warning of such leak occurrence. In the unlikely event of such leakage, the sleeve 124 may be removed and replaced, with new O-rings in place, by use of tool 140 (FIG. 11) which is adapted to interconnect with the upper end of the sleeve 124 and enable it to be moved vertically to or away from its installed position as shown in FIG. 4.

With the exception of the replaceable filter cartridges and the adapter assembly shown in FIG. 18, it is intended that all of the various components of the apparatus herein disclosed be formed from high grade stainless steel. Sleeve 124, shown in FIG. 10, may be a disposable component formed from a high quality thermoplastic having sufficient structural integrity to enable its manipulation and replacement as required.

Although the presently preferred embodiment of the apparatus of the present invention has been described with some particularity, it is to be understood that other embodiments or variations may be made without departing from the spirit and scope of the invention, as those skilled in the art will readily understand. Such embodiments, variations, or modifications are considered to be within the purview and scope of the invention and the appended claims.

What is claimed is:

1. Apparatus for filtering particulate matter from a fluid flow pumped from a coolant pool of a nuclear reactor, comprising:

a normally sealed vessel defining an interior chamber;

a rigid turntable structure means for rotatably mounting the turntable structure on a central axis in the chamber and having means therewith stationarily supporting thereon a plurality of disposable filter cartridges in spaced-apart parallel relation to each other;

fluid conduit means including a linear section extending centrally into the chamber and having an inlet in sealed connection therewith for conducting fluid to be filtered from a point outside the vessel and downwardly through the linear section;

manifold means within the chamber for receiving a fluid flow from the linear section and directing it to the filter cartridges;

first normally closed gate means mounted on the vessel permitting selective extension of a turntable manipulating tool therethrough for manually rotating the structure to thereby advance the filter cartridges on the structure through successive operative positions within the chamber;

second normally closed gate means on the vessel to permit selective insertion of a filter manipulating tool into the chamber; and third normally closed gate means on the vessel to permit installation of filter cartridges into the chamber and onto the turntable and expulsion of contaminated filter cartridges from the vessel.

2. The apparatus of claim 1 further comprising means for fixedly connecting the turntable structure to the manifold means.

3. The apparatus of claim 1 wherein the first normally closed gate means is mounted on the vessel in alignment with the central axis through the vessel.

4. The apparatus of claim 1 wherein the second normally closed gate means is mounted on a first side of the vessel.

5. The apparatus of claim 4 wherein the third normally closed gate means are mounted on a second side of the vessel.

6. A system for filtering particulate matter from a coolant flow pumped from a pool of a nuclear reactor, comprising:

a vessel substantially circular in horizontal cross-section and having a continuous circular side wall, a top wall, and a bottom wall defining an inner chamber;

the chamber having a turntable means for rotatably mounting the turntable to the vessel to rotate about a vertical central axis therein;

the turntable including a manifold assembly having a distributor extending generally horizontally across the chamber;

means for fixedly connecting the turntable to the distributer;

the manifold assembly further including a conduit section extending coincident to the vertical axis and upward from the distributor for receiving therethrough a flow of coolant from the pool and means for directing the flow of coolant into the distributor; and filter means carried on the turntable and in flow communication with the distributor to receive and filter the coolant.

7. The system of claim 6 wherein the filter means is a plurality of filter cartridges removably secured upon the turntable in a predetermined specific arrangement beneath the manifold assembly.

8. The system of claim 6 further including gate means on the vessel to enable filter cartridges to be selectively manipulated into and out of the vessel.

9. The system of claim 6 wherein said means for directing comprises a hollow torroidal ring for defining an outer peripheral edge of the distributer, wherein the torroidal ring has inwardly-facing spaced apart nozzles for directing coolant flow into the distributer to the filter cartridges.

10. Apparatus for filtering particulate matter from the liquid coolant pool of a nuclear reactor comprising:

a stationary vessel defining a normally closed chamber;

a plurality of replaceable filter cartridges within the chamber;

distribution means within the chamber for directing a pressurized flow of liquid to be filtered through the cartridges;

a turntable within the chamber for supporting the filter cartridges;

gate means on the vessel to accommodate downward insertion into the chamber of a tool for manipulating the turntable;

a conduit section leading from the gate means and into the chamber to the distribution means;

a coolant flow inlet leading from outside the chamber and inward to the conduit section;

the conduit section serving to conduct coolant flow from the inlet to the distribution means during filtration operation of the apparatus;

an end of the conduit section adajacent the gate means being adapted to insertably accept a tool therein for manipulating the turntable during operative shut-down of the apparatus when the gate means is disposed to an open position;

means for mounting the turntable to the vessel such that the turntable can rotate in relation a central axis of the vessel and slide a limited distance within the chamber and along the central axis; and the conduit section being an extended hub of the turntable and having a socket cavity formed at an end thereof for engaging a tool for manual rotation or sliding of the turntable.

11. The apparatus of claim 10 wherein the conduit section extends through an opening in a wall of a vessel, said gate means is located in sealed registration with the wall opening, and the cavity socket is situated inwardly adjacent the first gate means.

12. The apparatus of claim 10 further including second gate means permitting the downward insertion into the chamber of a tool for manipulating filter cartridges therein.

13. Apparatus for filtering particulate matter from fluid coolant of a nuclear reactor, comprising:

a vessel defining a chamber;

rotatable means in the chamber for supporting a plurality of filter cartridges disposed in spaced-apart relation across the chamber;

coolant distribution means in sealed fluid flow communication with the cartridges within the chamber;

first gate means on a first end of the vessel for installing filter cartridges into the vessel;

second gate means on a second end of the vessel enabling filter cartridge ejection from the vessel;

means for installing cartridges through the first gate means and ejecting cartridges through the second gate means, all from a remote position outside the vessel; and means for selectively discharging filtered coolant from the chamber.

* * * * *